United States Patent [19]
Gram et al.

[11] Patent Number: 5,868,122
[45] Date of Patent: Feb. 9, 1999

[54] COMPRESSED NATURAL GAS CYLINDER PUMP AND REVERSE CASCADE FUEL SUPPLY SYSTEM

[75] Inventors: Anker Gram, Vancouver; Stephen Duncan Noble, West Vancouver, both of Canada

[73] Assignee: Westport Research Inc., Vancouver, Canada

[21] Appl. No.: 1,912

[22] Filed: Dec. 31, 1997

[51] Int. Cl.[6] .................................................. F02M 21/04
[52] U.S. Cl. .......................................................... 123/527
[58] Field of Search ............................................ 123/527

[56] References Cited

U.S. PATENT DOCUMENTS

| | | | |
|---|---|---|---|
| 4,523,548 | 6/1985 | Engel et al. | 123/527 |
| 5,067,467 | 11/1991 | Hill et al. | |
| 5,351,726 | 10/1994 | Diggins | 123/527 |
| 5,375,580 | 12/1994 | Stolz et al. | 123/527 |
| 5,501,200 | 3/1996 | Bogartz | 123/527 |
| 5,505,232 | 4/1996 | Barclay | 123/527 |
| 5,694,985 | 12/1997 | Diggins | 123/527 |

*Primary Examiner*—John Kwon
*Attorney, Agent, or Firm*—McAndrews, Held & Malloy, Ltd.

[57] ABSTRACT

The invention relates to an apparatus and method for supplying high pressure gaseous fuel from a storage vessel to an internal combustion engine of a vehicle, or for other uses. A reverse cascade fuel supply apparatus for a vehicle comprising: (a) a storage tank for storing high pressure gaseous fuel; (b) an intermediate pressure accumulator for storing high pressure gaseous fuel, connected by a pipe to the storage tank; (c) a high pressure accumulator for storing high pressure gaseous fuel connected by a pipe to the intermediate accumulator and by a pipe to the storage tank; (d) a gaseous fuel compressing intensifier connected by a pipe to the storage tank, the intermediate pressure accumulator and the high pressure accumulator; and (e) a plurality of on-off pressure controlled valves located in the pipes connecting the storage tank, the intermediate accumulator, the high pressure accumulator and the intensifier, for enabling selective pumping to and withdrawal of high pressure gaseous fuel from the storage tank, the intermediate accumulator, the high pressure accumulator, the intensifier or the engine, according to a reverse cascade fuel supply program.

11 Claims, 3 Drawing Sheets

COMPRESSED NATURAL GAS CYLINDER PUMP AND REVERSE CASCADE FUEL SUPPLY SYSTEM

TECHNICAL FIELD OF THE INVENTION

The invention relates to an apparatus and method for supplying high pressure gaseous fuel from a storage vessel to an internal combustion engine of a vehicle, or for other uses. More particularly, the invention pertains to a reverse cascade fuel supply system where the pressure in one or more storage vessels is variable and pressure above fuel injection pressure and within a pre-determined acceptable operating range must be maintained.

BACKGROUND OF THE INVENTION

To inject gaseous fuel into an internal combustion engine, the fuel pressure must be raised higher than the pressure in the piston combustion chamber. For a compression ignition engine, such as a diesel engine, a fuel pressure as high as 200 bar (approx. 3,000 psig) may be required to inject the fuel and to ensure combustion. Compressed gaseous fuel is typically supplied from pressure rated storage vessels carried on board the vehicle. As the fuel is consumed, the pressure in the storage vessels drops. To consistently maintain the pressure of gaseous fuels within a pre-determined acceptable operating range for injection into the combustion chamber of the internal combustion engine, it is necessary to provide a means for increasing the pressure of the gaseous fuel. The pre-determined acceptable operating range is determinable from the optimal injection pressure which depends upon the particular characteristics of a given engine.

An intensifier is a compressor which increases the pressure of a gas supplied from a variable pressure source, such as a tank holding compressed natural gas (CNG) to an end use for the gas, such as an internal combustion engine. It is well known to locate a small accumulator vessel near a fuel injector to maintain the gaseous fuel pressure at the injector within a consistent pre-determined acceptable operating range notwithstanding the varying pressure in the gaseous fuel supply system and storage vessel. When the gas pressure in the accumulator decreases, it is known to use an intensifier to deliver compressed gaseous fuel from the storage vessel to the accumulator vessel. When the pressure in the accumulator rises to the upper limit of the pre-determined acceptable operating range, the intensifier typically shuts off. Accordingly, pressure in the accumulator is kept within a pre-determined acceptable operating range.

SUMMARY OF INVENTION

The Invention is directed to a reverse cascade fuel supply apparatus for a vehicle comprising: (a) a storage tank for storing high pressure gaseous fuel; (b) an intermediate pressure accumulator for storing high pressure gaseous fuel, fluidly connected to the storage tank; (c) a high pressure accumulator for storing high pressure gaseous fuel fluidly connected to the intermediate accumulator and to the storage tank; (d) a gaseous fuel compressing intensifier fluidly connected to the storage tank, the intermediate pressure accumulator and the high pressure accumulator; and (e) a plurality of on-off pressure controlled valves located in conduits connecting the storage tank, the intermediate accumulator, the high pressure accumulator and the intensifier, for enabling selective introduction to and withdrawal of pressurized gaseous fuel from the storage tank, the intermediate accumulator, the high pressure accumulator, the intensifier or the engine.

The intensifier can be driven by a power member. The intensifier power member can be a hydraulic pump supplied with oil from a hydraulic reservoir.

The apparatus can include a cooler for cooling compressed gaseous fuel expelled by the intensifier and a conditioner for conditioning pressurized gaseous fuel by exchanging heat between coolant of an engine connected to the apparatus and heat contained in the pressurized gaseous fuel.

Oil pumped from the hydraulic pump can be delivered to the intensifier through a hydraulic oil control valve. The hydraulic oil control valve can be controlled by a programmed hydraulic controller. The intensifier can be a slow double-action hydraulically activated piston-cylinder gas compressor.

The plurality of on-off valves can be electric solenoid valves, a first solenoid valve being positioned in a pipe between the storage tank and the intensifier, a second solenoid valve being positioned in a pipe between the intermediate accumulator and the intensifier, a third solenoid valve being positioned in a pipe between the intermediate accumulator and the high pressure accumulator, a fourth solenoid valve being positioned in a pipe between the high pressure accumulator and the conditioner, a fifth solenoid valve being positioned in a pipe between the high pressure accumulator and the intensifier, and a sixth solenoid valve being positioned between the conditioner and the internal combustion engine.

The invention is also directed to an intensifier for compressing and pumping gas comprising: (a) a hollow cylindrical oil holding chamber; (b) a first piston reciprocally mounted in the oil holding chamber; (c) a hollow cylindrical gas holding chamber; (d) a second piston reciprocally mounted in the gas holding chamber, the second piston being connected to the first piston; (e) a first oil line in the oil holding chamber, located on a first side of the first piston, and a second oil line in the oil holding chamber located on a second side of the first piston opposite the first side; and (f) a first gas inlet and a first gas outlet in the gas holding chamber located on a first side of the second piston, and a second gas inlet and a second gas outlet in the gas holding chamber located on a second side of the second piston.

The intensifier can include at least two gas sealing rings on the second piston. The first oil line and the second oil line can be connected to a hydraulic oil control valve which can regulate whether oil is passed to the oil holding chamber through the first oil line or the second oil line, or returned to an oil reservoir. The intensifier can include a programmed hydraulic controller which can control the hydraulic oil control valve and a hydraulic pump which can pump oil to the hydraulic oil control valve.

The invention is also directed to a method of supplying a pressurized gaseous fuel stream from a fuel storage supply to a gaseous fuel consuming engine according to a reverse cascade fuel supply protocol comprising: (a) pressurizing a gaseous fuel storage tank from the fuel storage supply, an intermediate gaseous fuel accumulator and a high pressure gaseous fuel accumulator to a first pressure which is higher than a second pressure of the gaseous fuel supplied to the gaseous fuel consuming engine; (b) withdrawing gaseous fuel from the high pressure gaseous fuel accumulator and the fuel storage tank and the intermediate gaseous fuel accumulator until the pressure in the high pressure gaseous fuel accumulator is reduced to the second pressure; (c) supplying gaseous fuel to the engine from the high pressure accumulator and maintaining pressure in the high pressure accumulator higher than the second pressure but less than a third pressure which is higher than the second pressure, by withdrawing gaseous fuel from the storage tank and the intermediate pressure accumulator and intensifying the pressure of said withdrawn gaseous fuel and transferring the compressed gaseous fuel to the high pressure accumulator until the third pressure in the high pressure accumulator is reached, said withdrawing of gaseous fuel from the storage tank and the intermediate pressure accumulator and intensification of the pressure of the gaseous fuel continuing until the gaseous fuel pressure in the storage tank and the intermediate pressure accumulator is reduced to a fourth pressure which is lower than the second pressure; (d) supplying gaseous fuel to the engine from the high pressure accumulator and, as a first priority, maintaining pressure in the high pressure accumulator higher than the second pressure but less than the third pressure by withdrawing gaseous fuel from the intermediate pressure accumulator only and intensifying the pressure of the withdrawn fuel and transferring the gaseous fuel to the high pressure accumulator until the pressure in the high pressure accumulator reaches the third pressure; and, as a second priority, withdrawing gaseous fuel from the storage tank and intensifying the pressure of the withdrawn gaseous fuel and transferring the pressure intensified fuel to the intermediate pressure accumulator, when the pressure in the intermediate accumulator drops below the fourth pressure, the pressure intensification and transfer of the gaseous fuel to the intermediate pressure accumulator continuing until the gaseous fuel pressure in the intermediate pressure accumulator reaches a fifth pressure, which is higher than the fourth pressure, said withdrawing of gaseous fuel from the storage tank continuing until the gaseous fuel pressure in the storage tank is reduced to a sixth pressure which is lower than the fourth pressure; (e) supplying gaseous fuel to the engine from the high pressure accumulator and maintaining pressure in the high pressure accumulator higher than the second pressure but less than the third pressure, by withdrawing gaseous fuel from the intermediate pressure accumulator and intensifying the pressure of the withdrawn gaseous fuel and transferring the pressure intensified gaseous fuel to the high pressure accumulator, said withdrawing of gaseous fuel from the intermediate pressure accumulator continuing until the pressure in the intermediate accumulator is reduced to the sixth pressure; and (f) withdrawing gaseous fuel from the high pressure accumulator and pressure intensifying the withdrawn gaseous fuel to a pressure higher than the second pressure and lower than the third pressure and transferring the pressure intensified gaseous fuel to the fuel consuming engine.

BRIEF DESCRIPTION OF DRAWINGS

In drawings which illustrate specific embodiments of the invention, but which should not be construed as restricting the spirit or scope of the invention in any way.

DETAILED DESCRIPTION OF PREFERRED EMBODIMENTS OF THE INVENTION

Figure 1:
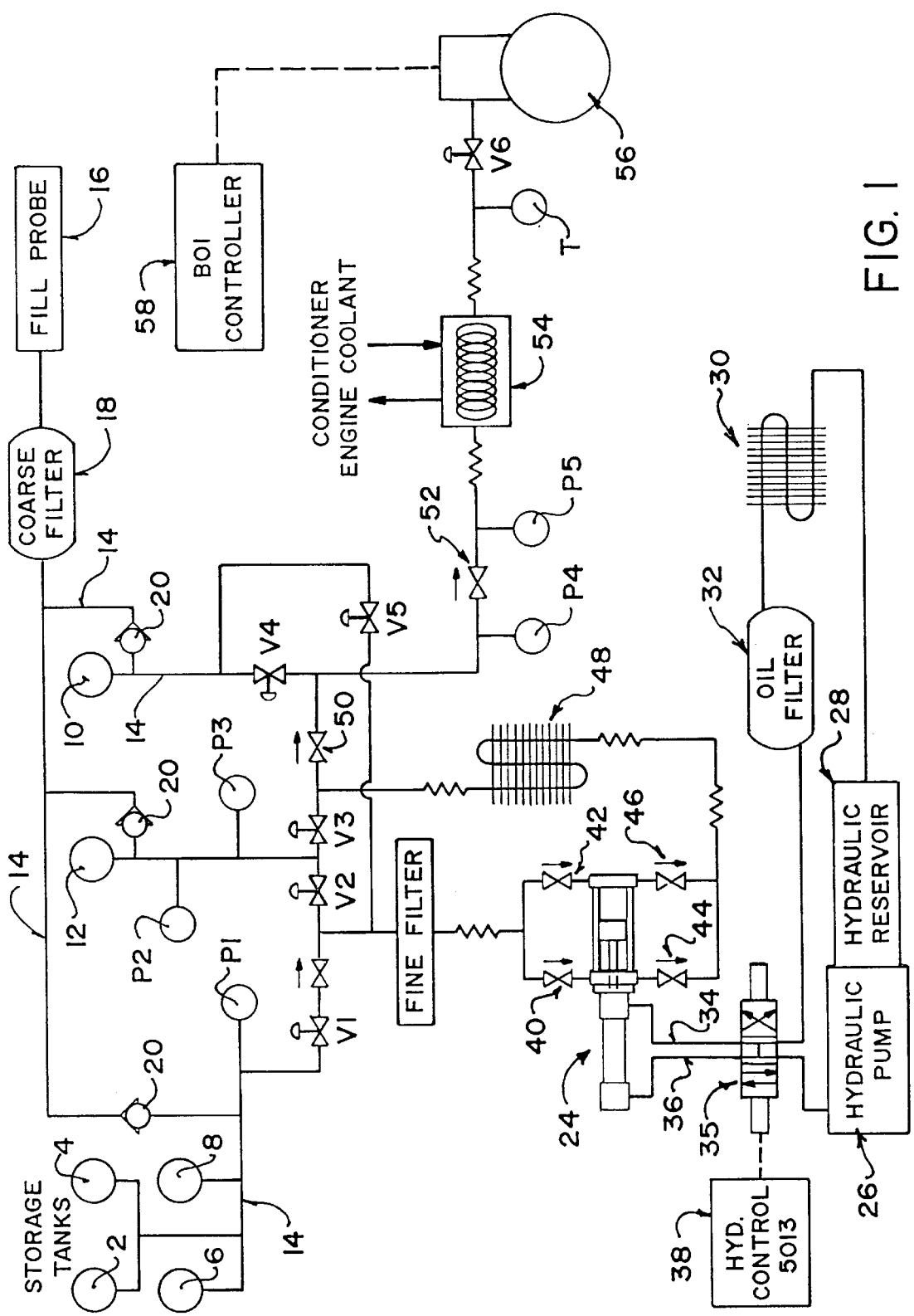
FIG. 1 illustrates a flow diagram and components for a reverse cascading compressed natural gas (CNG) system according to the invention.

The problem of compressing gas to a high pressure, for example, to 3000 psig or higher, from a variable pressure source, which may drop, for example, to pressures as low as 300 psig, is a difficult engineering challenge of sufficient importance in the gas compression industry that the device used for compression according to the invention has been given the special name "intensifier".

Running an internal combustion engine of a vehicle on compressed natural gas is one example of the aforementioned gas compression challenge. There are a number of difficult problems inherent with conventional gaseous fuel supply systems for internal combustion engines. One is that to increase pressure from about 300 psig to about 3000 psig conventionally requires a large two-stage compressor to fulfil the fuel consumption requirements of the engine. But when a large two-stage compressor is used, considerable power is required to drive the compressor when the inlet pressure is high.

A further difficult operating condition is the variability in rate of fuel consumption associated with an internal combustion engine used to drive a vehicle during normal operation. Fuel consumption requirements vary depending upon the demand made of the engine due to varying load. For example, the engine may consume more fuel while the vehicle is accelerating, or climbing a hill. At other times, much less fuel is needed, for example, when the vehicle is maintaining a constant velocity or descending a hill. The lowest fuel requirement occurs at idle speed of the engine, where there is no load. For a vehicle with a compression ignition engine, during normal operation, the rate of fuel consumption may therefore vary by about a factor of ten and the higher rate of fuel consumption may occur only 10 percent of the time.

To deal with and solve these difficult problems, there is a need for an apparatus and a system which is adapted for supplying gaseous fuel consistently at a high pressure within an pre-determined acceptable operating range, while at the same time being able to operate under the difficult and variable operating conditions inherent with using a gaseous fuel supply system for an internal combustion engine.

When a vehicle is operating on compressed natural gas (CNG), the operating conditions vary considerably. The vehicle, after a refuelling, will typically have the fuel tank or fuel tanks, which are typically gas cylinders, filled to a pressure higher than the engine injector pressure. However, during operation of the engine, and consumption of compressed natural gas fuel, the storage pressure in the fuel tank(s) will decline. The pressure must therefore be boosted, or intensified, to satisfy the pressure demand of the fuel injector of the engine.

We have invented a novel slow moving double-action hydraulic oil cylinder, double-action piston cylinder gas compressor which in combination with a reverse cascading fuel supply system solves the problems inherent in coping with a high gas pressure demand, variable engine load, and declining fuel tank pressures.

Reverse Cascade Fuel Supply Apparatus

FIG. 1 illustrates a flow diagram for a reverse cascading CNG system according to the invention. As can be seen in FIG. 1, by employing a unique arrangement of gas storage vessels, valves and piping, the gas injection intensifier 24 will maintain over 3000 psig pressure in a high pressure accumulator 10, which feeds the injectors of the engine 56.

Figure 2:
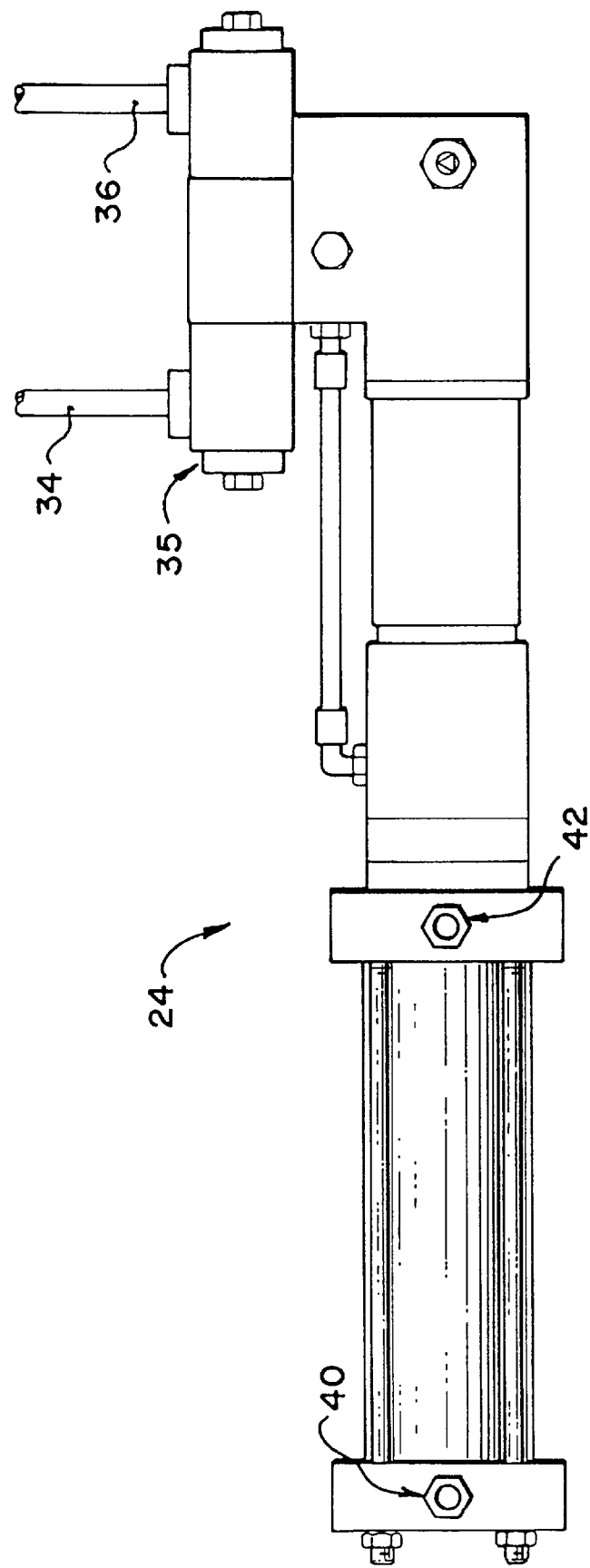
FIG. 2 illustrates an elevation view of a double action hydraulic intensifier for a compressed natural gas (CNG) system, according to the invention.
Figure 3:
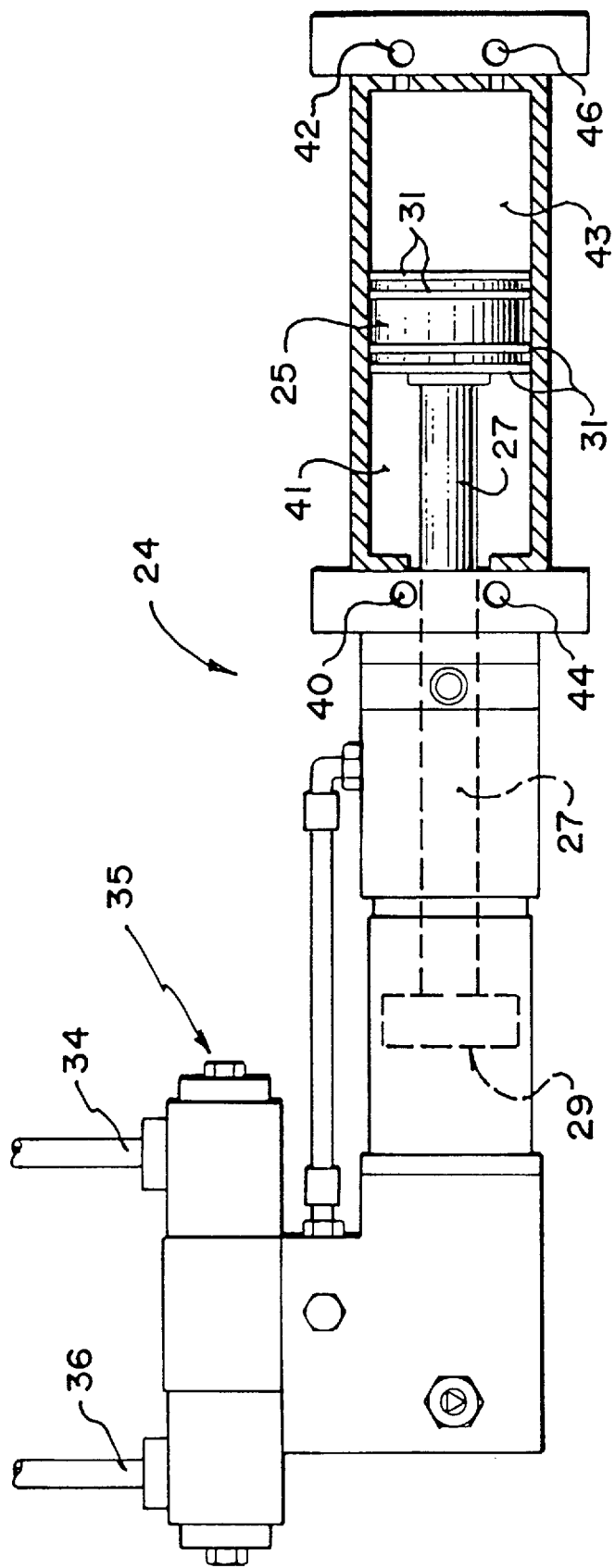
FIG. 3 illustrates a partial cut-away view of the double action hydraulic intensifier.

The intensifier illustrated in FIG. 1 is shown in more detail in FIGS. 2 and 3. FIG. 2 illustrates an elevation view of the double action hydraulic intensifier 24 for a compressed natural gas (CNG) system, according to the invention. FIG. 3 illustrates a partial cut-away view of the double action hydraulic intensifier 24. Compressed natural gas (CNG) from the storage tanks 2, 4, 6 and 8 is compressed by the intensifier 24. The intensifier 24 is powered by hydraulic pump 26. The pump 26 supplies oil to the intensifier 24 through a hydraulic oil control valve 35 which is controlled by programmed hydraulic controller 38. The pump 26 operates continuously and is sized to provide sufficient capacity for the engine injectors with a compression ratio of about 1:2, with engine at maximum load.

As illustrated in FIG. 1, the CNG fuel storage is made up of four compressed gas storage tanks 2, 4, 6 and 8, a high pressure accumulator 10 and an intermediate pressure accumulator 12. The four compressed gas storage tanks 2, 4, 6 and 8 serve as general CNG storage, and are typically conventional high pressure gas cylinders linked together by pipes 14. The number of the cylinders can be decreased or increased to suit specific applications.

When fuel filling is required, the storage tanks 2, 4, 6 and 8, the high pressure accumulator 10 and the intermediate pressure accumulator 12 are filled at a conventional CNG fuel supply station via fill probe 16 and pipes 14. The fuel from the fuel supply station is filtered through coarse filter 18 to remove any sediment. The pipes 14 connecting the four storage tanks 2, 4, 6 and 8, the high pressure accumulator 10 and intermediate pressure accumulator 12 together incorporate therein a series of one-way check valves 20 to ensure that the CNG flows only in the desired direction from one tank to another. The series of interconnecting pipes 14 have appropriate pressure switches $P_1$, $P_2$, $P_3$, $P_4$ and $P_5$ to switch the solenoid valves when prescribed pressures are reached. The series of pipes 14 emanating from the tanks 2, 4, 6 and 8, the high pressure accumulator 10 and the intermediate pressure accumulator 12 are connected through a series of on-off valves (which are typically electrically operated solenoid valves), V1, V2, V3, V4 and V5 to a fine filter 22 and then to a double action intensifier 24, which will be described in more detail below in association with FIGS. 2 and 3.

As seen in FIG. 1, the intensifier 24 is driven by a hydraulic pump 26, which is supplied by hydraulic oil that is held in hydraulic oil reservoir 28. The pump 26 runs continuously and the oil is recycled through an oil cooler 30 to keep it cool and an oil filter 32 to filter out fine sediment. The hydraulic pump 26 via hydraulic oil control valve 35 drives the intensifier 24 in double action reciprocal mode by alternating the flow of oil through the pair of pipes 34 and 36 or in a neutral position returning the oil to the oil reservoir 28. The reciprocating action of control valve 35 is controlled by a programmed hydraulic controller 38.

The pumping chambers 41 and 43 of the double action intensifier 24 alternatively receive CNG from the storage tanks 2, 4, 6 and 8, high pressure accumulator 10 and intermediate pressure accumulator 12 through pipes 14 and inlet valves 40 and 42. The reciprocating pump pumps the CNG at higher pressure through outlet valves 44 and 46 to aftercooler 48. The pressurized CNG is then passed through valve 50 to the high pressure accumulator 10 and through valve 52 to engine coolant conditioner 54. From there, it is passed through on-off valve V6 to the injectors (not shown) of engine 56. The engine 56 operation is controlled by a programmed BOI controller 58.

FIG. 2 illustrates an elevation view of the novel slow moving double action hydraulic intensifier 24 for a compressed natural gas (CNG) system, according to the invention. FIG. 3 illustrates a partial cut-away view of the slow moving double action hydraulic intensifier 24. As seen in FIG. 3, the intensifier 24 has a slow moving double pumping action (reciprocating action) created by reciprocating piston 25, which is driven by shaft 27, which in turn is driven by a reciprocating hydraulic oil piston 29 (shown in dotted lines) inside a cylinder. Piston 25 has at least two energized sealing rings 31 which are suitable for slow movement use.

Compressed gas is alternatively drawn into and pumped out of chambers 41 and 43. The hydraulic piston 29 is driven in reciprocating action by alternately supplying pressurized hydraulic fluid through hydraulic drive pipes 34 and 36 to either side of the piston 29. (See also FIG. 1.) The hydraulic cylinder and piston 29 and pump 26 (see FIG. 1) are conventional and can be purchased commercially. The intensifier 24 illustrated in FIG. 2 shows only a pair of one-way gas inlet valves 40 and 42. (The gas outlet valves are on the opposite side.) Alternatively, these inlet valves 40 and 42 can be outlet valves (see valves 44 and 46 in FIG. 1), and the inlet valves 40 and 42 can be on the opposite side. FIG. 3 illustrates basically the same intensifier as illustrated in FIG. 2 but includes a slight variation of FIG. 2 where the one-way gas inlet valves 40 and 42, and the one-way gas outlet valves 44 and 46 are on the same side of the intensifier 24. This may be convenient in situations where the lines to and from the intensifier 24 should be on one side for space purposes.

Operation of Reverse Cascade Fuel Supply System

To illustrate the operation of the reverse cascade fuel supply system, the following assumptions have been made. These assumptions basically reflect commercial compressed natural gas (CNG) practice.

(1) The fuelling station fills all storage vessels 2, 4, 6, 8, high pressure accumulator 10 and intermediate pressure accumulator 12 to 3400 psig. During fuelling, valves V1, V2, V3, V4 and V5 are closed.

(2) The fuel injectors of the engine 56 demand 3000 psig pressure which is fed from the high pressure accumulator 10.

(3) When gas pressure in the storage tanks and accumulators drops to about 300 psig, the system requires refuelling.

In a typical fuelling and engine operation cycle, the following events (phases) will occur after all four cylinders 2, 4, 6 and 8 and the intermediate pressure accumulator 12 and the high pressure accumulator 10 have initially been filled with CNG to a first pressure of about 3400 psig.

Phase 1

The engine 56 is being fed from all CNG cylinders 2, 4, 6 and 8, the intermediate pressure accumulator 12 and the high pressure accumulator 10, until the pressure in storage tanks 2, 4, 6 and 8, intermediate pressure accumulator 12 and high pressure accumulator 10 is reduced to a second pressure of about 3000 psig. During this phase, the intensifier 24 does not operate, and valves V1, V2, V3 and V4 are open while V5 is closed.

Phase 2

The engine 56 is principally supplied with CNG from the high pressure accumulator 10 at all times. When the pressure in the high pressure accumulator 10 is reduced to the second pressure of about 3000 psig, the intensifier 24, driven by pump 26, starts up and continues pumping until the pressure in the high pressure accumulator 10 is increased above 3000 psig but is less than a suitable maximum third pressure, for example, 3600 psig.

The intensifier 24 is supplied with CNG from the storage cylinders 2, 4, 6 and 8 and the intermediate pressure accumulator 12.

During phase 2, valves V1, V2 and V4 are open while valves V3 and V5 are closed. This phase continues until the pressure in the storage cylinders 2, 4, 6 and 8 and the intermediate pressure accumulator 12 is reduced to a fourth pressure of about 1500 psig.

Phase 3

The engine 56 continues to be principally supplied with CNG from the high pressure accumulator 10. The intensifier 24 continues to operate and maintain the pressure in the high pressure accumulator 10 between the second pressure of about 3000 psig and the maximum third pressure of 3600 psig, as a first priority. The high pressure accumulator 10 and the intensifier 24 are supplied with CNG from only the intermediate pressure accumulator 12 during this phase. As a second priority, the pressure in the intermediate pressure accumulator 12 is maintained between a pressure higher than the fourth pressure of about 1500 psig but less than a fifth prescribed pressure of about 2000 psig by intensifying CNG drawn from the storage tanks 2, 4, 6 and 8. This phase is continued until the pressure in the storage tanks is reduced to a sixth pressure of about 300 psig. During this phase, valve V1 is open, valve V2 is open as a first priority and closed as a second priority, valve V3 is closed as a first priority and open as a second priority, valve V4 is open and valve V5 is closed.

Discussing phase 3 in more detail, when the pressure in the high pressure accumulator 10 reaches the third prescribed pressure of 3400 psig to 3600 psig, the intensifier 24 does not shut off, but continues operating. But at this time, the CNG is supplied from the storage tanks 2, 4, 6 and 8 only and the intensifier 24 pumps the CNG into the intermediate pressure accumulator 12 until the pressure in it is higher than the fourth pressure of about 1500 psig but less than the fifth pressure of about 2000 psig. This is done by changing the valve positions as a second priority as follows: Valve V1 is open, valve V2 is closed, valve V3 is open, valve V4 is open and valve V5 is closed.

In this second priority mode, the intensifier 24 operates each time the pressure in the intermediate accumulator 12 drops below the fourth pressure of about 1500 psig and pumps CNG until the pressure in the intermediate pressure accumulator 12 has reached the fifth pressure of about 2000 psig.

This gas flow may be temporarily interrupted when the pressure in high pressure accumulator 10 drops below the second prescribed pressure of about 3000 psig. In such a case, the valves are switched to the first priority where valves V1 and V2 are open, valve V3 is closed, valve V4 is open and valve V5 is closed, and CNG is delivered from the intermediate pressure accumulator 12 to the high pressure accumulator 10.

Phase 3 continues until the pressure in storage tanks 2, 4, 6 and 8 is reduced to the sixth pressure of about 300 psig, and the storage tanks 2, 4, 6 and 8 are essentially empty of CNG.

Phase 4

By this time, the CNG pressure in tanks 2, 4, 6 and 8 has dropped to the sixth pressure of about 300 psig and has been basically depleted. The intensifier 24 is supplied with CNG from the intermediate pressure accumulator 12 only and intensifies and pumps the gas into the high pressure accumulator 10, maintaining the pressure in the high pressure accumulator 10 higher than the second prescribed pressure of about 3000 psig and less than the third prescribed pressure of about 3600 psig. Nonetheless, the engine 56 continues to be principally supplied with CNG from the high pressure accumulator 10. During this phase, valve V1 is open, valve V2 is open, valve V3 is closed, valve V4 is open and valve V5 is closed.

Phase 4 continues until the CNG pressure in the intermediate pressure accumulator 12 is reduced to the sixth pressure of about 300 psig and is thus essentially empty of CNG.

Phase 5

During this final phase, the pressure of the CNG in the tanks 2, 4, 6 and 8 and intermediate accumulator 12 has dropped to about 300 psig and the CNG has been depleted. The intensifier 24 is supplied with CNG from the high pressure accumulator 10 only. It discharges this intensified pressure gas directly into the engine 56. The pressure in the fuel supply line to the engine 56 is maintained at a pressure higher than the second prescribed pressure of about 3000 psig and less than the third prescribed pressure of about 3600 psig. During this phase, valve V1 is open, valves V2, V3 and V4 are closed and valve V5 is open.

At the completion of Phase 5, the fuel supply system has been exhausted and the system must be refilled at a CNG fuel supply station.

Summary of Reverse Cascade Fuel Supply Procedure

Fill-up

Fill the storage tanks 2, 4, 6 and 8, the intermediate accumulator 12 and the high pressure accumulator 10 with CNG from an external source to a first described pressure (e.g. 3400 psig) higher than the injection pressure of the engine, e.g. 3000 psig.

Phase 1

Supply the engine 56 with CNG from the storage tanks 2, 4, 6 and 8, the intermediate accumulator 12 and the high pressure accumulator 10 until the overall pressure is reduced to a second described pressure (e.g. 3000 psig).

Phase 2

Supply the engine 56 from the high pressure accumulator 10 and maintain pressure in the high pressure accumulator 10 higher than the second described pressure, but less than a third maximum described pressure (e.g. about 3600 psig), by intensifying gas from the intermediate accumulator 12 and the storage tanks 2, 4, 6 and 8. Continue this procedure until the pressure in the storage tanks 2, 4, 6 and 8 and the intermediate accumulator 12 reaches a fourth described pressure (e.g. about 1500 psig).

Phase 3

Supply the engine 56 from the high pressure accumulator 10 and maintain the pressure in the high pressure accumulator 10 higher than the second described pressure, but less than the third described pressure, by intensifying gas from the intermediate accumulator 12 only and maintaining pressure in the intermediate accumulator 12 higher than the fourth described pressure but less than a fifth described pressure (e.g. about 2000 psig) by intensifying the gas from the storage tanks 2, 4, 6 and 8 only. Continue this procedure until the pressure in the storage tanks 2, 4, 6 and 8 drops a sixth described pressure (e.g. about 300 psig).

Phase 4

Supply the engine 56 from the high pressure accumulator 10 and maintain pressure in the high pressure accumulator 10 higher than the second described pressure, but less than the third described pressure, by intensifying gas from the intermediate accumulator 12 only. Continue this procedure until the pressure in the intermediate accumulator 12 is reduced to a sixth described pressure (e.g. about 300 psig).

Phase 5

Supply and maintain pressure in the transfer line to the engine 56 higher than the second described pressure but less than the third described pressure by intensifying gas from the high pressure accumulator 10 only. Continue this procedure until the pressure in the high pressure accumulator 10 is reduced to the sixth described pressure (e.g. about 300 psig).

Summary of Valve Positions During Reverse Cascade
Fuel Supply Procedure: O = Open: C = Closed

|  | V1 | V2 | V3 | V4 | V5 |
|---|---|---|---|---|---|
| Fill-up | C | C | C | C | C |
| Phase 1 | O | O | O | O | C |
| Phase 2 | O | O | C | O | C |
| Phase 3 |  |  |  |  |  |
| -First Priority | O | O | C | O | C |
| -Second Priority | O | C | O | O | C |
| Phase 4 | O | O | C | O | C |
| Phase 5 | O | C | C | C | O |

Typical Pressures for Reverse Cascade Fuel Supply Procedure

| First pressure | 3400 psig |
|---|---|
| Second pressure | 3000 psig |
| Third pressure | 3600 psig (possibly 3400) |
| Fourth pressure | 1500 psig |
| Fifth pressure | 2000 psig |
| Sixth pressure | 300 psig |

The reverse cascading fuel supply system, according to the invention, provides a number of important advantages. Through the reverse cascading arrangement outlined above, it is possible for a single small slow moving double-action one-stage intensifier 24 to boost gas pressure from about 300 psig to about 3600 psig, that is, a compression ratio of over 12 to 1. A large expensive two-stage compressor is not required. With this system, the intensifier 24 will maintain pressure in the high pressure accumulator 10 above 3000 psig while in its spare time, it will maintain pressure in the intermediate pressure accumulator 12 above 1500 psig. As the capacity of the one-stage intensifier 24 is sufficient to supply CNG demand at peak power when supplied with gas at 1500 psig, and the vehicle engine may only be required to deliver peak power during 10% of its operating hours, the intensifier 24 has plenty of time to intensify and pump low pressure gas from the CNG storage tanks 2, 4, 6 and 8 into the intermediate accumulator 12.

A further advantage of the novel hydraulic driven double-action intensifier 24 is that it is slow acting with a long stroke. This has the following benefits:

(1) The slow action of the intensifier permits very tight piston seal rings to be used.

(2) The heat of compression generated by the intensifier has time to dissipate during the stroke.

(3) The long stroke minimizes the adverse effect of dead space.

The overall result of the slow moving double-action intensifier according to the invention is a compression which can operate with compression ratios several times higher than conventional fast action-short stroke compressors.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A reverse cascade fuel supply apparatus for a vehicle comprising:

(a) a storage tank for storing high pressure gaseous fuel;

(b) an intermediate pressure accumulator for storing high pressure gaseous fuel, fluidly connected to the storage tank;

(c) a high pressure accumulator for storing high pressure gaseous fuel fluidly connected to the intermediate accumulator and to the storage tank;

(d) a gaseous fuel compressing intensifier fluidly connected to the storage tank, the intermediate pressure accumulator and the high pressure accumulator; and (e) a plurality of on-off pressure controlled valves located in conduits connecting the storage tank, the intermediate accumulator, the high pressure accumulator and the intensifier, for enabling selective introduction to and withdrawal of pressurized gaseous fuel from the storage tank, the intermediate accumulator, the high pressure accumulator, the intensifier or the engine.

2. An apparatus as claimed in claim 1 wherein the intensifier is driven by a power member.

3. An apparatus as claimed in claim 2 wherein the intensifier power member is a hydraulic pump supplied with oil from a hydraulic reservoir.

4. An apparatus as claimed in claim 1 including a cooler for cooling compressed gaseous fuel expelled by the intensifier.

5. An apparatus as claimed in claim 1 including a conditioner for conditioning pressurized gaseous fuel by exchanging heat between coolant of an engine connected to the apparatus and heat contained in the pressurized gaseous fuel.

6. An apparatus as claimed in claim 3 wherein oil pumped from the hydraulic pump is delivered to the intensifier through a hydraulic oil control valve.

7. An apparatus as claimed in claim 6 wherein the hydraulic oil control valve is controlled by a programmed hydraulic controller.

8. An apparatus as claimed in claim 1 wherein the intensifier is a slow double-action hydraulically activated piston-cylinder gas compressor.

9. An apparatus as claimed in claim 1 wherein the plurality of on-off valves are electric solenoid valves, a first solenoid valve being positioned in a pipe between the storage tank and the intensifier, a second solenoid valve being positioned in a pipe between the intermediate accumulator and the intensifier, a third solenoid valve being positioned in a pipe between the intermediate accumulator and the high pressure accumulator, a fourth solenoid valve being positioned in a pipe between the high pressure accumulator and the conditioner, a fifth solenoid valve being positioned in a pipe between the high pressure accumulator and the intensifier, and a sixth solenoid valve being positioned between the conditioner and the internal combustion engine.

10. A method of supplying a pressurized gaseous fuel stream from a fuel storage supply to a gaseous fuel consuming engine according to a reverse cascade fuel supply protocol comprising:

(a) pressurizing a gaseous fuel storage tank from the fuel storage supply, an intermediate gaseous fuel accumulator and a high pressure gaseous fuel accumulator to a first pressure which is higher than a second pressure of the gaseous fuel supplied to the gaseous fuel consuming engine;

(b) withdrawing gaseous fuel from the high pressure gaseous fuel accumulator and the fuel storage tank and the intermediate gaseous fuel accumulator until the pressure in the high pressure gaseous fuel accumulator is reduced to the second pressure;

(c) supplying gaseous fuel to the engine from the high pressure accumulator and maintaining pressure in the high pressure accumulator higher than the second pressure but less than a third pressure which is higher than the second pressure, by withdrawing gaseous fuel from the storage tank and the intermediate pressure accumulator and intensifying the pressure of said withdrawn gaseous fuel and transferring the compressed gaseous fuel to the high pressure accumulator until the third pressure in the high pressure accumulator is reached, said withdrawing of gaseous fuel from the storage tank and the intermediate pressure accumulator and intensification of the pressure of the gaseous fuel continuing until the gaseous fuel pressure in the storage tank and the intermediate pressure accumulator is reduced to a fourth pressure which is lower than the second pressure;

(d) supplying gaseous fuel to the engine from the high pressure accumulator and, as a first priority, maintaining pressure in the high pressure accumulator higher than the second pressure but less than the third pressure by withdrawing gaseous fuel from the intermediate pressure accumulator only and intensifying the pressure of the withdrawn fuel and transferring the gaseous fuel to the high pressure accumulator until the pressure in the high pressure accumulator reaches the third pressure; and, as a second priority, withdrawing gaseous fuel from the storage tank and intensifying the pressure of the withdrawn gaseous fuel and transferring the pressure intensified fuel to the intermediate pressure accumulator, when the pressure in the intermediate accumulator drops below the fourth pressure, the pressure intensification and transfer of the gaseous fuel to the intermediate pressure accumulator continuing until the gaseous fuel pressure in the intermediate pressure accumulator reaches a fifth pressure, which is higher than the fourth pressure, said withdrawing of gaseous fuel from the storage tank continuing until the gaseous fuel pressure in the storage tank is reduced to a sixth pressure which is lower than the fourth pressure;

(e) supplying gaseous fuel to the engine from the high pressure accumulator and maintaining pressure in the high pressure accumulator higher than the second pressure but less than the third pressure, by withdrawing gaseous fuel from the intermediate pressure accumulator and intensifying the pressure of the withdrawn gaseous fuel and transferring the pressure intensified gaseous fuel to the high pressure accumulator, said withdrawing of gaseous fuel from the intermediate pressure accumulator continuing until the pressure in the intermediate accumulator is reduced to the sixth pressure; and (f) withdrawing gaseous fuel from the high pressure accumulator and pressure intensifying the withdrawn gaseous fuel to a pressure higher than the second pressure and lower than the third pressure and transferring the pressure intensified gaseous fuel to the fuel consuming engine.

11. A method as claimed in claim 10 wherein the gaseous fuel is pressure intensified with a slow moving double-action hydraulic piston cylinder, gas piston cylinder combination.

* * * * *